No. 837,680. PATENTED DEC. 4, 1906.
G. W. GOEHNS.
OILER FOR GAS ENGINES AND THE LIKE.
APPLICATION FILED APR. 16, 1906.
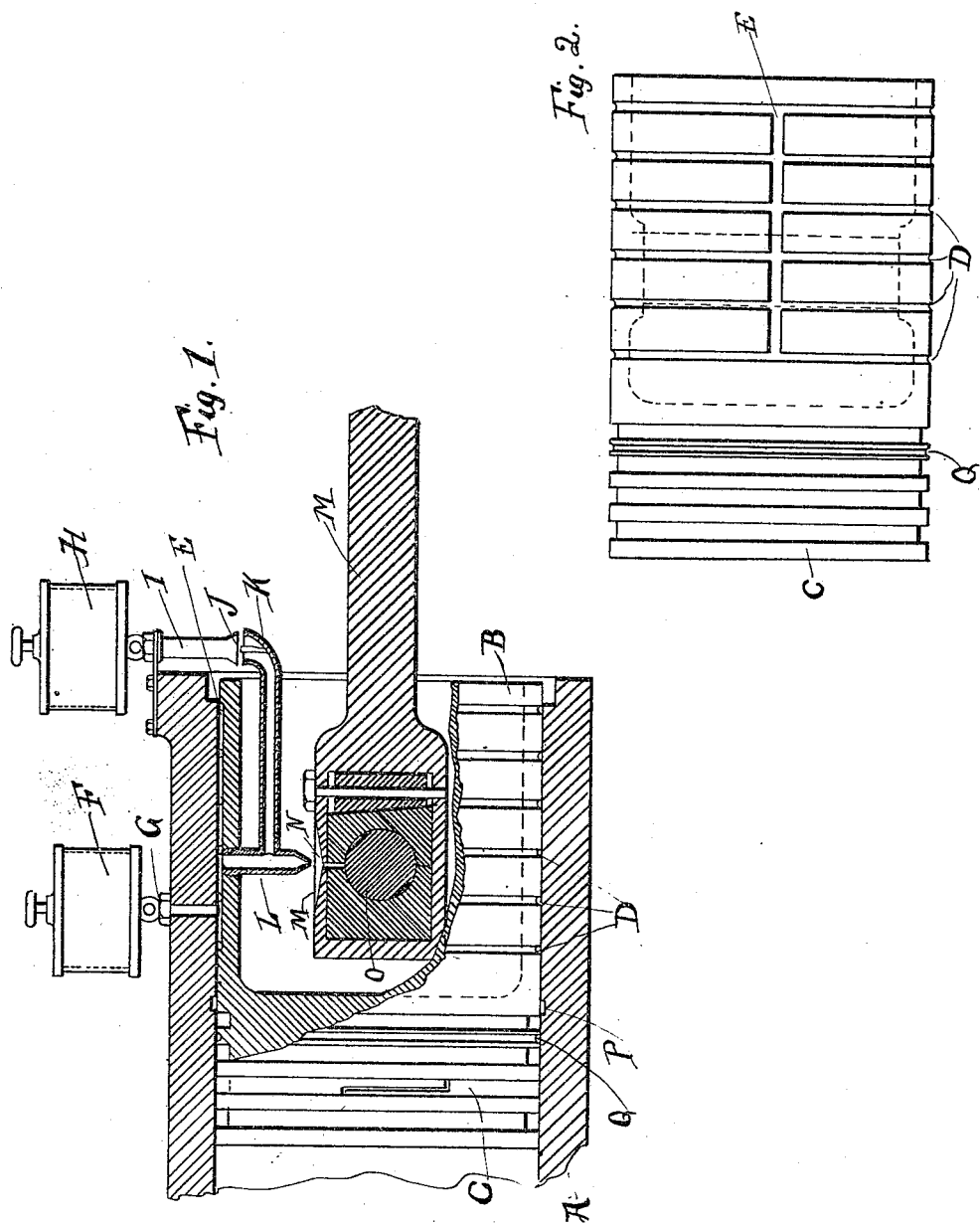
WITNESS:
Francis A. Pocock
S Williamson
INVENTOR
George W. Goehns.
BY
W. Preston Williamson
ATTORNEY

UNITED STATES PATENT OFFICE.

GEORGE W. GOEHNS, OF PHILADELPHIA, PENNSYLVANIA.

OILER FOR GAS-ENGINES AND THE LIKE.

No. 837,680.   Specification of Letters Patent.   Patented Dec. 4, 1906.

Application filed April 16, 1906. Serial No. 311,841.

*To all whom it may concern:*

Be it known that I, GEORGE W. GOEHNS, a citizen of the United States, residing at Philadelphia, county of Philadelphia, and State of Pennsylvania, have invented a certain new and useful Improvement in Oilers for Gas-Engines and the Like, of which the following is a specification.

My invention relates to a new and useful improvement in oilers for gas-engines and the like, and has for its object to provide a simple and effective arrangement by which the wrist-pin and trunk-cylinder may be properly lubricated while the engine is in operation and to also provide for the proper lubrication of the bearing-surfaces between the cylinder and piston.

With these ends in view this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawings, forming a part of this specification, in which—

Figure 1 is a longitudinal section of a portion of a cylinder, showing the piston therein, the piston being partially broken away and sectioned so as to show the means of conveying the oil to the wrist-pin; Fig. 2, an exterior view of the piston looking downward.

In carrying out my invention as here embodied, A represents the cylinder, and B the piston fitted to slide therein. This piston has fitted thereto the usual packing-rings C, and around the trunk portion of the piston are formed the grooves D for receiving oil from the cross groove or channel E and conveying said oil back and forth within the cylinder.

F is an oil-cup connected by the pipe G to the interior of the cylinder, so as to feed oil to the channel E, from whence it will be fed to the grooves D, as will be readily understood. H also represents an oil-cup, which is attached to the cylinder and is provided with the feed-pipe I, the latter having at its lower end a feed-wick J, which permits a small quantity of oil to percolate therethrough and accumulate upon the lower end thereof for the purpose hereinafter set forth.

K is a pipe leading from the outside of the piston B and extending within said piston to the drip-pipe L, the lower end of which is contracted and located immediately above the head of the connecting-rod M, and in said head is formed an inclined recess N to catch the oil dripping from the pipe L, said oil being conveyed through a small hole to the wrist-pin O.

In practice as the piston moves back and forth at the end of each forward stroke the upturned end of the pipe K will come in contact with the wick J and receive the oil accumulated thereon, this oil being conveyed through the pipes K and L to the recess N, as just described, thus constantly supplying oil to the wrist-pin while the engine is in operation, so as to keep it properly lubricated.

In order to prevent the piston from hammering by the rings C forming a shoulder in the cylinder at the end of the stroke of the piston, I form a groove P around the interior of the cylinder at the point where the forward ring upon the piston will just overlap said groove at the forward stroke of said piston, thus forming a clearance, and I also prefer to form a groove Q around the piston behind the outer ring, so as to convey oil to the rear portion of the cylinder.

Of course I do not wish to be limited to the use of my improvement in connection with any particular style of engine, as it is adapted for use in any engine using a trunk-piston.

Having thus fully described my invention, what I claim as new and useful is—

1. In combination with an engine of the character described, a piston having a series of grooves formed around its outer circumference, a longitudinal channel connecting said grooves and means for supplying oil to said channel, as specified.

2. In combination with an engine of the character described, a piston having a series of grooves formed around its outer circumference, a longitudinal channel connecting said grooves, an oil-cup adapted to feed oil to said channel, a second oil-cup, a feed-pipe leading downward from the last-named oil-cup, a feeding-wick carried by the lower end of said feed-pipe, a pipe K carried by the piston and adapted to receive oil from the wick, a drip-pipe L to which the pipe K is secured and a piston-rod head having a recess formed therein for catching the oil falling from the drip-pipe, as specified.

3. In combination with an engine of the character described, a hollow piston, a drip-pipe secured within said piston, the outlet from said pipe being located immediately above a recess formed in the piston-rod head, a pipe K secured to the drip-pipe its outer end projecting beyond the piston and turned upward, a feed-pipe I having a feed-wick J secured in its lower end adapted to deliver oil to the pipe K at each outward stroke of the piston and an oil-cup connected with the pipe I for supplying oil thereto, as specified.

In testimony whereof I have hereunto affixed my signature in the presence of two subscribing witnesses.

GEORGE W. GOEHNS.

Witnesses:
W. T. PARKER,
WM. H. GOEHNS.